US012326726B2

(12) United States Patent
Heyl et al.

(10) Patent No.: US 12,326,726 B2
(45) Date of Patent: Jun. 10, 2025

(54) METHOD FOR LOCATION-DEPENDENT VERIFICATION OF A TELEOPERATOR FOR REMOTE CONTROL OF A VEHICLE

(71) Applicant: Robert Bosch GmbH, Stuttgart (DE)

(72) Inventors: Andreas Heyl, Weil der Stadt (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 279 days.

(21) Appl. No.: 18/295,341

(22) Filed: Apr. 4, 2023

(65) Prior Publication Data

US 2023/0384784 A1 Nov. 30, 2023

(30) Foreign Application Priority Data

May 31, 2022 (DE) ...................... 10 2022 205 519.5

(51) Int. Cl.
*G05D 1/00* (2006.01)
*H04W 4/40* (2018.01)
*H04W 12/069* (2021.01)

(52) U.S. Cl.
CPC ............ *G05D 1/0022* (2013.01); *H04W 4/40* (2018.02); *H04W 12/069* (2021.01)

(58) Field of Classification Search
CPC ............ G05D 1/0022; G05D 2105/22; G05D 2107/13; G05D 2109/10; G05D 1/2265; H04W 4/40; H04W 12/069; H04W 12/08

USPC .............................................................. 701/2
See application file for complete search history.

(56) References Cited

U.S. PATENT DOCUMENTS

| 10,459,444 | B1 * | 10/2019 | Kentley-Klay | ........ G07C 5/008 |
| 10,807,591 | B1 * | 10/2020 | Kentley-Klay | ........ G08B 21/10 |
| 2021/0201464 | A1 * | 7/2021 | Tariq | ..................... G06V 10/811 |
| 2021/0323573 | A1 * | 10/2021 | Gogna | .............. G01C 21/3407 |
| 2022/0075366 | A1 * | 3/2022 | Blank | ................. B60W 60/001 |

FOREIGN PATENT DOCUMENTS

JP          2021-528790     * 10/2021

* cited by examiner

Primary Examiner — Muhammad Shafi
(74) Attorney, Agent, or Firm — NORTON ROSE FULBRIGHT US LLP

(57) ABSTRACT

A method for location-dependent verification of a teleoperator for remote control of a vehicle. At its current location, the vehicle repeatedly and automatedly performs the following: receiving, from the teleoperator, during remote control by the teleoperator, a response message requested via a network, ascertaining a current value of at least one network-dependent property of the received response message, determining a target value of the at least one network-dependent property, verifying the teleoperator by means of a verification of the current value of the at least one network-dependent property and of the determined target value based on a test condition, wherein in the case of a positive test result of the check, the teleoperator is authorized to perform the remote control of the vehicle, and in the case of a negative test result of the check, the vehicle terminates the remote control and/or sends a safety warning.

10 Claims, 2 Drawing Sheets

METHOD FOR LOCATION-DEPENDENT VERIFICATION OF A TELEOPERATOR FOR REMOTE CONTROL OF A VEHICLE

CROSS REFERENCE

The present application claims the benefit under 35 U.S.C. § 119 of German Patent Application No. DE 10 2022 205 519.5 filed May 31, 2022, which is expressly incorporated herein by reference in its entirety.

FIELD

The present invention relates to a method for location-dependent verification of a teleoperator for remote control of a vehicle. Furthermore, the present invention relates to a computer program and to a device for this purpose.

BACKGROUND INFORMATION

The use of autonomous vehicles is already possible today under certain technical and legal conditions. Highly automated driving (HAD) is a technical development stage between assisted and autonomous driving. In assisted driving, a driver is assisted in a driving task by various driver assistance systems. In autonomous driving, the vehicle travels autonomously and without driver intervention.

However, complex traffic situations, such as construction site areas, are still difficult to handle for autonomous vehicles. If the autonomous vehicle cannot handle the driving situation by itself, a solution may be to request the assistance of a human operator who assists the driving situation from a work place or location spatially remote from the vehicle, i.e., remotely controls the vehicle. This so-called teleoperated driving thus allows for a completely driverless operation, in which an operator can monitor several vehicles worldwide.

Highly automated driving, such as autonomous shuttles, or so-called robotic taxis, thus requires the possibility of remotely controlled driving (teleoperated driving (ToD)) as a way of avoiding situations that the vehicle cannot solve by itself.

At the same time, the possibility of remotely controlling the vehicle may pose a safety risk. Furthermore, it is possible that there are further reasons, such as national legislation, that prohibit remote control of a vehicle from another country.

Basically, for remotely controlled and autonomous vehicles, individual solutions for controlling safety-critical communication in remotely controlled or autonomous driving systems are described in the related art. The overall safety during remote control by a spatially remote operator or "driver" is often not yet sufficiently considered. For example, there is no check of a geographic location or region. The country or state and/or jurisdiction is conventionally also not securely verified from the communication between the operator and the vehicle.

SUMMARY

An object of the present invention is to provide a method, a computer program, and a device. Features and details of the present invention arise from the disclosure herein. Of course, features and details described in connection with the method according to the present invention also apply in connection with the computer program according to the present invention and the device according to the present invention, and respectively vice versa, so that with respect to the disclosure, mutual reference to the individual aspects of the present invention is or can always be made.

Advantageously, a method according to the present invention for location-dependent verification of a teleoperator is used for remote control of a vehicle. In particular, according to an example embodiment of the present invention, it is provided in this case that the vehicle, in particular at its current location, performs the following method steps repeatedly and automatedly:

receiving, from the teleoperator, during remote control by the teleoperator, a response message requested via a network, ascertaining a current value of at least one network-dependent property of the received response message, determining a target value of the at least one network-dependent property, verifying the teleoperator by means of a check of the current value of the at least one network-dependent property and of the determined target value on the basis of a test condition, wherein in the case of a positive test result of the check, the teleoperator is authorized to perform the remote control of the vehicle, and that in the case of a negative test result of the check, the vehicle terminates the remote control and/or sends a safety warning.

This may have an advantage that the vehicle can thus utilize a specific, unique change in the at least one network-dependent property of the response message received via the network, preferably via a network route, to verify the teleoperator. The network route refers to the path in the network from the teleoperator to the vehicle.

Teleoperation or remote control in the context of vehicles may preferably be understood to mean operating a vehicle across a spatial distance. In particular, remotely controlled driving means that a vehicle is remotely controlled in normal traffic. While the driver controls the vehicle from a teleoperation center, which may be several kilometers or hundreds of kilometers away, the driver can obtain information about the environment of the vehicle. This may include a video feed, a GPS position on a map, and the current weather conditions. On the basis of this information, the driver can control the vehicle from the center. Remotely controlled driving (teleoperated driving (ToD)) is thus an important safety and backup measure, for example for many types of internal failures or sudden out-of-ODD situations.

Optionally, the method according to an example embodiment of the present invention may be provided in connection with other security mechanisms, such as end-to-end encryption, use of security certificates (PKI), or use of ledger technology, such as blockchains with smart contracts. This has the advantage that the verification of the teleoperator in combination with one of the mentioned protective measures adds a further, additional protection layer or security level in a multi-layered security approach and further increases safety.

Blockchains may be defined as a decentralized ledger technology. In particular, blockchains are a single common and distributed ledger that is distributed across several network elements, such as network routers or network nodes, in a peer-to-peer network.

Blockchain technology provides an open, decentralized infrastructure for managing the value exchange on a network.

Preferably, according to an example embodiment of the present invention, it may be provided that the current location of the vehicle is located in a region, wherein the determination of the target value comprises the following step:

selecting the target value from a list of target values of the at least one network-dependent property from a vehicle data base as a function of the region of the current location, wherein the target values are each specific to different regions, wherein in the case of a positive test result, the teleoperator is authorized to perform remote control of the vehicle in the region of the current location, and in the case of a negative test result, the safety warning is sent to a predefined network facility and/or to other vehicles in the same region.

This selection of the target values increases the security of the remote control of the vehicle by an authorized teleoperator in different regions. Advantageously, the vehicle may thus utilize a specific, unique change in the at least one network-dependent property of the response message received via the network, in order to check the geographic source of the received response message.

Furthermore, according to an example embodiment of the present invention, it may optionally be provided that the target values in the vehicle data base are regularly updated. This may be provided, for example, on a daily or also hourly basis in order to ensure secure remote control of the vehicle.

Furthermore, in the context of the present invention, it is optionally possible for the at least one network-dependent property to be a latency, wherein the ascertainment of the current value of the latency comprises the following step:

ascertaining a time difference between a time of receiving the response message requested via the network and a time of requesting the response message, wherein the target value is selected from a list of maximally permissible latencies $L_{r,b}$ from the vehicle data base, wherein r denotes a particular region and b denotes a specific teleoperator, wherein during the verification of the teleoperator, the test condition comprises that the ascertained time difference is less than or equal to the selected maximally permissible latency $L_{r,b}$.

This may have an advantage that by checking the current latency with the predetermined target value of the region-specific latency, verification of the teleoperator is facilitated.

One of the at least one network-dependent property may advantageously be a physical property, such as a latency of the communication between the vehicle and the teleoperator. The latency may be defined as a lag time or a time difference that passes between the occurrence of a particular event and the subsequent event expected after the event. In the telecommunications and network technology environment, the latency may be the transit time that data need from the source to their destination.

Furthermore, according to an example embodiment of the present invention, it is optionally provided that after the ascertainment of the current value of the at least one network-dependent property, the following step is performed:

adjusting the current value using a model based on at least one network-dependent parameter, wherein the current value is adjusted by a correction value as a function of an occurrence of the at least one network-dependent parameter.

Considering a network-dependent parameter advantageously improves the quality and accuracy of the check. Furthermore, this has the advantage that the adjustment significantly increases the security of the accuracy of the test result and thus the more secure verification of the teleoperator.

Preferably, in the context of the present invention, it may be provided that the network-dependent parameter comprises a current local network utilization in the region, wherein the current value is adjusted by increasing or reducing the ascertained current value by the correction value.

According to an example embodiment of the present invention, a changing network utilization affects the speed of communication between the vehicle and the teleoperator. This means that transmitting requests or messages on the network is faster or slower. By considering network utilization, the result of the check is advantageously improved and the verification of the teleoperator is significantly more secure.

Optionally, according to an example embodiment of the present invention, it may be provided that the at least one network-dependent property is a digital property of the response message, wherein for transmitting the requested response message, the network comprises at least one network element, which respectively adds a digital property corresponding to the network element to the response message to be transmitted to the vehicle, wherein the ascertainment of the current value comprises the following step:

ascertaining, from the received response message, the digital property added by the teleoperator and each digital property added by the at least one network element, wherein during the verification of the teleoperator, the test condition comprises that the digital property added by the teleoperator and each digital property added by the at least one network element match the respectively corresponding valid target value.

This may have an advantage that the digital property of the message is passed from network element to network element, and each network element adds its own digital property to the message to be transmitted.

Furthermore, according to an example embodiment of the present invention, the optional use of a network of dedicated network elements allows for checking at each network element whether the received message is from a legitimate sender, preferably from the legitimate teleoperator. Dedicated means that a network element, such as a network router or network node, is configured specifically for transmitting requested response messages. For example, the communication between network elements in a network may be assigned to only one teleoperator, in particular to the teleoperator server. When dedicating servers, a particular server is assigned to serve a task on a network. The advantage of this is that the entire performance capacity of the server is available for handling one task area. This allows the vehicle to check, within the scope of the verification of the teleoperator, whether the received teleoperator message has come via a valid network route of the network and thus from a legitimate sender.

Furthermore, according to an example embodiment of the present invention it may be provided in the context of the present invention that the at least one network element respectively adds a digital property corresponding to the network element to the response message to be transmitted to the vehicle, provided that the transmitted digital property is valid on the network, wherein the ascertainment of the current value comprises the following step:

ascertaining, from the received response message, the digital property added by the at least one network element, wherein during the verification of the teleoperator, the test condition comprises that the digital property added by the at least one network element matches the corresponding valid target value, wherein the digital property is added by the network element directly connected to the vehicle. This has the advantage that each network element and the vehicle only require knowledge of the target value of the teleoperator and/or of the previous network element.

A further advantage may be achieved in the context of the present invention if the determination of the target value comprises the following step:

selecting the target value from a list of target values of digital properties for the teleoperator and for each network element from a vehicle data base as a function of the region of the current location, wherein the target values are each specific to different regions.

This allows a significant improvement in the security of remotely controlled driving since it impedes a potential attacker from taking over remote control without authorization.

Optionally, according to an example embodiment of the present invention, it is advantageously provided that the target values in the vehicle data base are updated regularly.

In addition, in the context of the present invention, it may be advantageous that the digital property is a digital watermark and/or a result of a key-dependent hash function.

A hash value generated using a key-dependent hash function HMAC (hash-based message authentication code) can consist of always equally long character strings regardless of the type and number of characters entered. A hash value or HMAC value can only be calculated by "legitimate" participants who know a shared secret key. Thus, the hash value is the result calculated using a key-dependent hash function. HMACs are specified in RFC 2104 as well as in the NIST standard FIPS 198. The term "fingerprint" is also used for the hash value. In cryptography, hash functions are generally used as digital signatures in order to authenticate the sent message so that the receiver can check whether the message is authentic and originates from the right person or source.

The digital watermark is a type of marking that is embedded in a digital medium and allows the source or the owner to be recognized.

Hash values, or digital watermarks, are advantageously stored in IPv6 extension headers. In IPv6, optional Internet layer information is encoded in separate headers that can be placed between the IPv6 header and the upper layer header in a packet. The length of the header may be an unsigned 8-bit integer; the length is in particular measured in 8-octet units, i.e., in bytes. A maximum of 256 bytes may be stored in such an optional header. Further technical details are regulated in IETFRFC 8200.

A further advantage in the context of the present invention can be achieved if the method comprises the following further method step:

sending a test request via the network to the teleoperator remotely controlling the vehicle.

This may have an advantage that the sending can be repeatedly and automatedly initiated by the vehicle in order to verify the teleoperator. Furthermore, with the sending of the test request, a random time may advantageously be selected to initiate the method according to the present invention and to thus make the verification of the teleoperator more secure.

An object of the present invention is also a computer program comprising instructions that, when the computer program is executed by a data processing device, cause the latter to execute the method according to the present invention. Thus, the computer program according to the present invention offers the same advantages as have been described in detail with reference to a method according to the present invention.

An object of the present invention is also a device for data processing, which is configured to execute the method according to the present invention. Thus, the data processing device according to the present invention offers the same advantages as have been described in detail with reference to a method according to the present invention. The data processing device is, for example, a control unit of the vehicle, which can comprise at least one processor and/or one microcontroller (with the processor) for executing the computer program according to the present invention.

An object of the present invention may also be a computer-readable storage medium comprising the computer program according to the present invention. The storage medium is, for example, designed as a data store, such as a hard drive and/or a non-volatile memory and/or a memory card. The storage medium can, for example, be integrated into the data processing device. The processor of the data processing device according to the present invention can, for example, be designed to read the computer program according to the present invention from the storage medium in order to execute the computer program according to the present invention.

Moreover, the method according to the present invention may also be designed as a computer-implemented method.

Further advantages, features and details of the present invention arise from the following description, in which exemplary embodiments of the present invention are described in detail with reference to the figures. The features mentioned herein can be essential to the present invention individually or in any combination.

DETAILED DESCRIPTION OF EXAMPLE EMBODIMENTS

Figure 1:
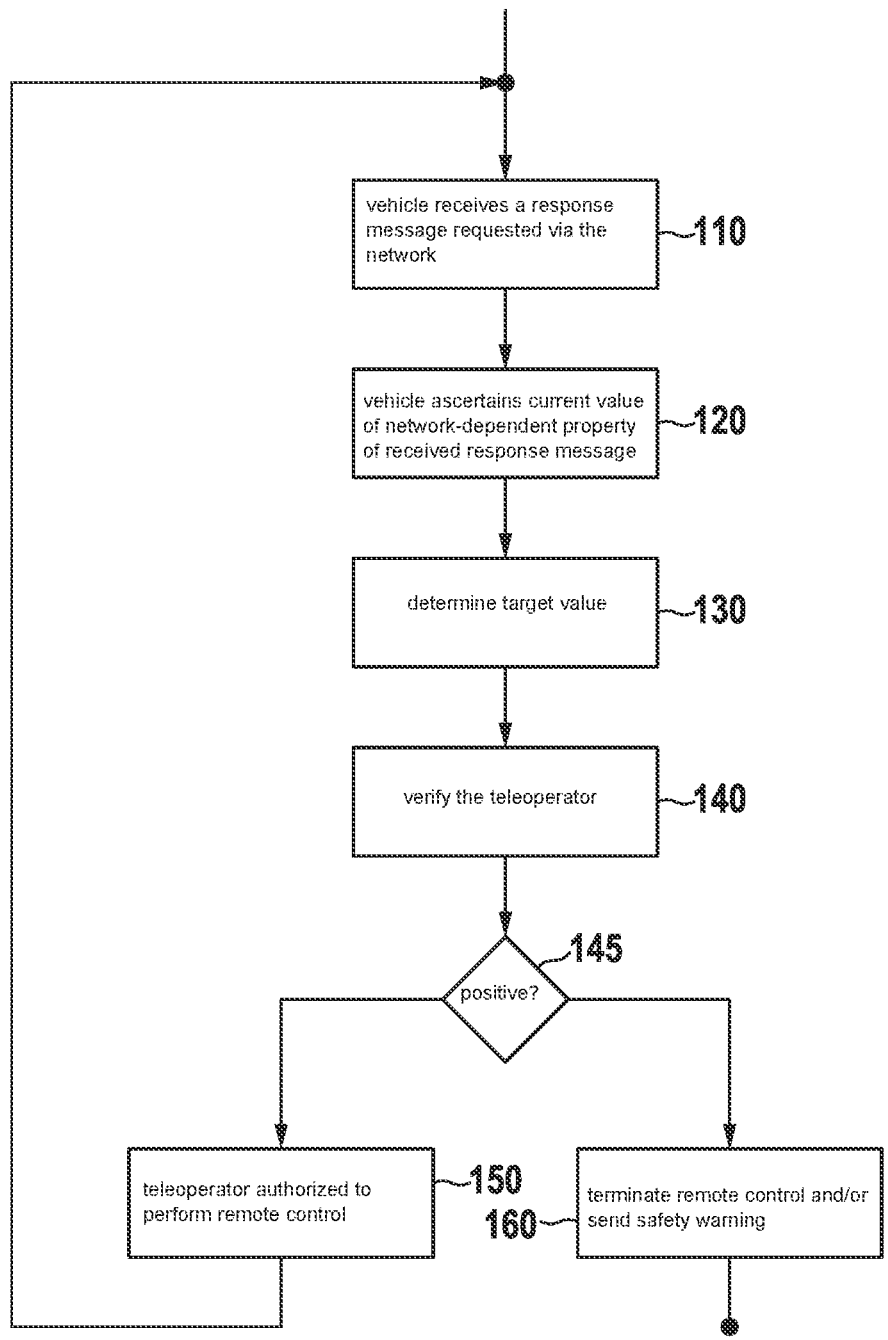
FIG. 1 schematically shows an example of a method according to the present invention.

FIG. 1 schematically shows an example of a sequence of a method according to the present invention. The method for location-dependent verification of a teleoperator 20 for remote control of a vehicle 10 is performed repeatedly and automatedly by a vehicle 10 at its current location via a network.

In step 110, during remote control by the teleoperator 20, the vehicle 10 receives, from the teleoperator 20, a response message requested via the network. In step 120, the vehicle ascertains a current value of at least one network-dependent property of the received response message.

In step 130, a target value of the at least one network-dependent property is determined.

In step 140, the vehicle verifies the teleoperator by means of a check 145 of the current value of the at least one network-dependent property and of the target value determined in step 130 on the basis of a test condition. In the case of a positive test result 150 of the check 145, the teleoperator 20 is authorized to perform the remote control of the vehicle 10. In the case of a negative test result 160 of the check 145, the vehicle 10 terminates the remote control and/or sends a safety warning.

Figure 2:
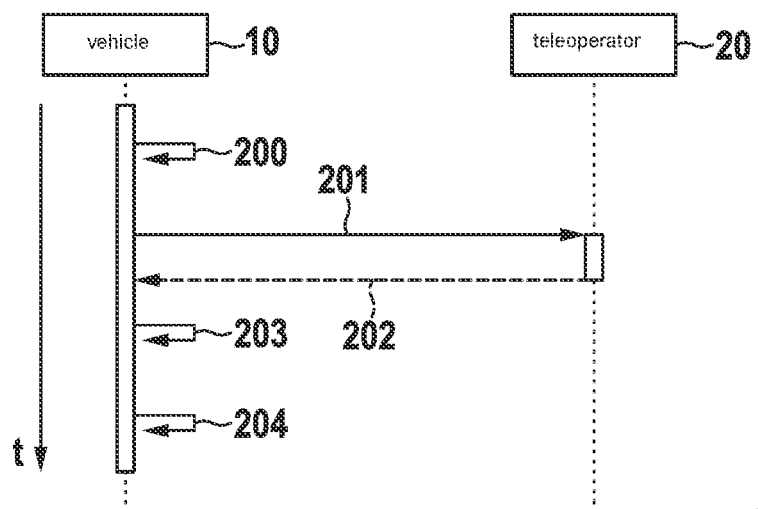
FIG. 2 schematically shows a further example of a method according to the present invention.

FIG. 2 schematically shows a further example of a method according to the present invention. FIG. 2 shows a vehicle 10, which is remotely controlled by a teleoperator 20. Furthermore, the vehicle has an on-board data base or vehicle data base (not shown), in which the maximally permissible latencies $L_{r,b}$ are stored, for example. Here, r denotes a particular region and b denotes a particular teleoperator 20. The on-board data base may be updated regularly with updated maximally permissible latencies $L_{r,b}$ and, where applicable, with changed teleoperator assignments in order to further increase the security of the method according to the present invention since regularly updating the data in the vehicle data base further significantly reduces the risk of abusive or legally impermissible remote control of the vehicle (intrusion).

In step 200, the vehicle 10 stores the time $t_0$ of sending the test request and sends 201, at random times and from the respective current location of the vehicle, a test request or a sample request to the teleoperator 20, for example a backend server 20, which is used in the remote control of the vehicle (teleoperated driving (ToD)). In addition, the vehicle 10 captures 200 the time $t_0$ when the test request is sent 201. Upon receipt of the test request, the teleoperator 20 immediately responds by sending 202 a predefined, special response message to the vehicle 10. The vehicle 10 ascertains 203 the time t between sending 201 the test request to the teleoperator 20, the time $t_0$, and receiving the corresponding response message, the time $t_1$. The ascertained time t from the difference between $t_1$ and to represents the latency determined for the vehicle 10 at the current location X.

Furthermore, the vehicle 10 ascertains 203 the current location at which the vehicle 10 is currently located geographically or locally. For example, the ascertainment 203 of the location may be performed using GPS data or other location determination technologies, such as triangulation. Using the ascertained location X of the vehicle 10, a spatial region r for which a particular teleoperator 20 is responsible can be assigned.

By assigning the vehicle 10 to a particular spatial region r, a particular maximally permissible latency $L_{r,b}$, can be determined for the assigned region r and the correspondingly assigned teleoperator 20.

In step 204, the vehicle 10, which communicates with the teleoperator 20, checks the condition whether the ascertained latency L at the time $t_1$ at the location X of the vehicle is less than or equal to the maximally permissible latency $L_{r,b}$ for the assigned region r, i.e., it 10 checks the condition whether $t \leq L_{r,b}$ for the test request sent by the vehicle 10 at the time to.

If the test condition is not satisfied, the vehicle 10 terminates communication with the teleoperator 20 and discards any further messages or notifications therefrom. The vehicle 10 also immediately sends an intrusion alarm to a predefined backend infrastructure (e.g., edge or cloud backends) or to vehicles in the vicinity.

If the test condition is satisfied, i.e., the test result is positive, the teleoperator 20 is verified as authorized for remote control of the vehicle 10.

According to one variant, the vehicle 10 could also use a model to adjust the maximally permissible latency $L_{r,b}$ using network-dependent conditions or network-dependent parameters. In this case, after the ascertainment 203 of the current value of the at least one network-dependent property, the vehicle 10 adjusts the current value using a model based on at least one network-dependent parameter, wherein the current value is adjusted by a correction value as a function of an occurrence of the at least one network-dependent parameter. For example, the model may have one or more rules or regulations that it can use in the adjustment in order to make a correction.

This improves the secure location-dependent authentication of the teleoperator 20 because the current network-dependent conditions can be used and considered with additional parameters, such as a current network utilization, if such parameters are available to the network or network infrastructure in a region r in which the vehicle 10 is located.

For example, if the vehicle 10 is located in the region r and connects to the nearest teleoperator 20, for example a remote control server 20, and the vehicle 10 does not have the information as to whether the connection to the teleoperator 20 is valid, the vehicle 10 sends a test request to the currently connected teleoperator 20. If this teleoperator 20 is a potential attacker and is located in a different region, a different country or even on a different continent, the method according to the present invention would help to verify the teleoperator 20 as an attacker. Because the greater the distance between the vehicle 10 and the potential attacker is, the greater is the ascertained latency L for the received response message, which then no longer satisfies the test condition, $t \leq L_{r,b}$. In the case of a negative test result, the attacker is detected and the connection between vehicle 10 and teleoperator/attacker 20 is immediately terminated. The attacker cannot prevent this result. Even if this cannot prevent such attacks from nearby networks since the test result is probably positive, it at least limits the attacks to particular regions and thus represents a valuable additional layer of defense in a multi-layered security approach.

Figure 3:
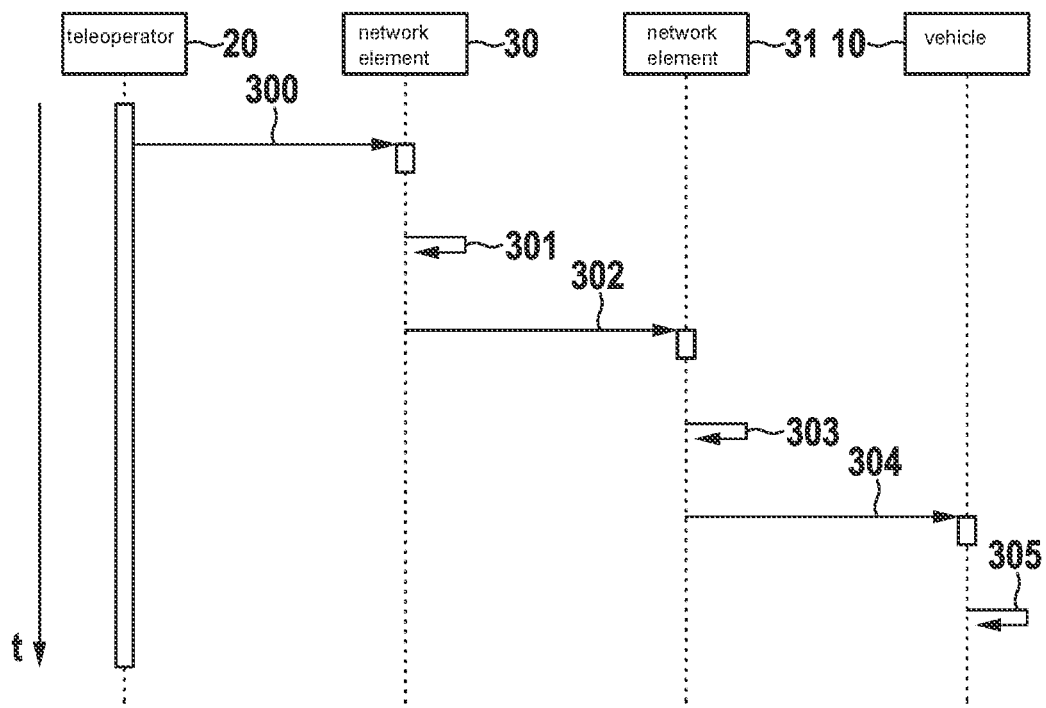
FIG. 3 schematically shows a further example of a method according to the present invention.

FIG. 3 schematically shows a further exemplary sequence of a method according to the present invention. FIG. 3 shows a vehicle 10, a teleoperator 20, at least one network element 30, 31, wherein the network element 30, 31 is in particular a network router 30, 31 or a network node 30, 31.

The network is designed as a dedicated network, wherein dedicated means that a network router is configured for transmitting requested response messages. For example, the communication between network elements or network routers in a network may be assigned to only one teleoperator, in particular to the teleoperator server. When dedicating servers, a particular computer is assigned to serve a task on a network. The advantage of this is that the entire performance capacity of the server is available for handling one task area.

The teleoperator 20, preferably the teleoperator server 20 or the backend server 20, stores a digital property, preferably a digital watermark or a hash value, in the response message requested by the vehicle 10. A hash value is in this case a result of a key-dependent hash function.

In step 300, the teleoperator sends the response message to the first router 30. Upon receipt of the response message, in step 301, the first router 30 checks the validity of the digital watermark added by the teleoperator 20 and/or the result of a key-dependent hash function.

If valid, the first router 30 adds, in step 302, the digital watermark or hash value of the first router 30 in the header data portion of the response message to be transmitted and sends it to the next router 31 in the dedicated network. In the header data portion of the response message, the response message now further comprises, in addition to the already added and validated digital watermark and/or the result of a key-dependent hash function of the teleoperator, the digital watermark associated with the first router 30 and/or the associated hash value as a result of a key-dependent hash function.

In step 303, the next router 31 now validates or checks the validity of the digital watermark respectively added by the teleoperator 20 and the first router 30 and/or the result of a key-dependent hash function.

If the validity is positively confirmed as a result, the router 31 now adds, in step 304, its digital watermark or its hash value to the response message to be transmitted and passes the response message to the vehicle 10.

In step 305, the vehicle 10 now checks the validity of the received response message. The vehicle 10 ascertains, from the received response message, the digital watermark added by the teleoperator 20 and each digital watermark added by the network routers 30, 31 and/or any result of a key-dependent hash function, wherein during the verification of the teleoperator 20, the test condition comprises that the digital watermark added by the teleoperator 20 and each digital watermark added by the network routers 30, 31 and/or each result of a key-dependent hash function match the respectively corresponding valid target value of the corresponding digital watermark and/or of the corresponding result of a key-dependent hash function.

According to a variant of the method according to the present invention, a scheme for checking the added digital watermark and/or the added result of a key-dependent hash function could optionally also be used. This alternative likewise requires a dedicated network with dedicated network routers or network nodes.

In contrast to the previous variant, in steps 301, 303 and 305, when the digital watermark and/or the result of a key-dependent hash function is respectively checked and when its validity is verified, a further digital watermark and/or a further result is not simply added to the previous one in the header data portion of the response message to be transmitted.

In this variant, in step 301, the digital watermark and/or result of a key-dependent hash function added by the teleoperator 20 and tested by the first network router 30 is overwritten by the own digital watermark and/or the own result of a key-dependent hash function if the validity of the digital watermark and/or of the result of a key-dependent hash function is verified.

In step 303, the digital watermark and/or result of a key-dependent hash function added by the first network router 30 and ascertained and tested by the next network router 31 is overwritten by the own digital watermark and/or the own result of a key-dependent hash function if the validity of the digital watermark and/or of the result of a key-dependent hash function is verified.

In step 305, the vehicle 10 finally ascertains, from the received response message, the digital watermark added by the network router 31 and/or the added result of a key-dependent hash function, wherein during the verification of the teleoperator 20, the test condition comprises that the digital watermark added by the network router 31 and/or the added result of a key-dependent hash function match the corresponding valid target value of the digital watermark and/or of the result of a key-dependent hash function. The network router 31 is connected directly to the vehicle.

This has the advantage that each network router 30, 31 and the vehicle 10 only require knowledge of the target value of the teleoperator 20 and/or of the previous network router 30, 31.

The above description of the exemplary embodiments describes the present invention solely in the context of examples. Of course, individual features of the embodiments can be freely combined with one another, insofar as technically sensible, without leaving the scope of the present invention.

What is claimed is:

1. The method for location-dependent verification of a teleoperator for remote control of a vehicle, wherein at its current location, the vehicle repeatedly and automatedly performs the following steps:
   receiving, from the teleoperator, during remote control by the teleoperator, a response message requested via a network;
   ascertaining a current value of at least one network-dependent property of the received response message;
   determining a target value of the at least one network-dependent property;
   verifying the teleoperator using a check of the current value of the at least one network-dependent property and of the determined target value based on a test condition, wherein, in the case of a positive test result of the check, the teleoperator is authorized to perform the remote control of the vehicle, and in the case of a negative test result of the check, the vehicle terminates the remote control and/or sends a safety warning;
   wherein after the ascertainment of the current value of the at least one network-dependent property, the following step is performed:
     adjusting the current value using a model based on at least one network-dependent parameter, wherein the current value is adjusted by a correction value as a function of an occurrence of the at least one network-dependent parameter; and
   wherein the current location of the vehicle is in a region, and the network-dependent parameter comprises a current local network utilization in the region, wherein the current value is adjusted by increasing or reducing the ascertained current value by the correction value.

2. The method according to claim 1, wherein the determination of the target value includes the following step:
   selecting the target value from a list of target values of the at least one network-dependent property from a vehicle data base as a function of the region of the current location, wherein the target values are each specific to different regions;
   wherein in the case of a positive test result of the check, the teleoperator is authorized to perform remote control of the vehicle in the region of the current location, and in the case of a negative test result of the check, the safety warning is sent to a predefined network facility and/or to other vehicles in the same region.

3. The method according to claim 2, wherein the at least one network-dependent property is a latency, wherein the ascertainment of the current value of the latency includes the following step:
   ascertaining a time difference between a time of receiving the response message requested via the network and a time of requesting the response message,
   wherein the target value is selected from a list of maximally permissible latencies $L_{r,b}$ from the vehicle data base, wherein r denotes a particular region and b denotes a specific teleoperator, wherein during the verification of the teleoperator, the test condition includes that the ascertained time difference is less than or equal to the selected maximally permissible latency $L_{r,b}$.

4. The method according to claim 1, wherein the at least one network-dependent property is a digital property of the response message, wherein for transmitting the requested response message, the network includes at least one network element, which respectively adds a digital property corresponding to the network element to the response message to be transmitted to the vehicle, wherein the ascertainment of the current value includes the following step:

ascertaining, from the received response message, the digital property added by the teleoperator and each digital property added by the at least one network element;

wherein during the verification of the teleoperator, the test condition including that the digital property added by the teleoperator and each digital property added by the at least one network element match the corresponding valid target value.

5. The method according to claim 4, wherein the at least one network element respectively adds a digital property corresponding to the network element to the response message to be transmitted to the vehicle, provided that the transmitted digital property is valid on the network, wherein the ascertainment of the current value includes the following step:

ascertaining, from the received response message, the digital property added by the at least one network element, wherein during the verification of the teleoperator, the test condition includes that the digital property added by the at least one network element matches the corresponding valid target value, wherein the digital property is added by the network element directly connected to the vehicle.

6. The method according to claim 4, wherein the digital property is a digital watermark and/or a result of a key-dependent hash function.

7. The method according to claim 1, wherein the determination of the target value includes the following step:

selecting the target value from a list of target values of digital properties for the teleoperator and for each network element from a vehicle data base as a function of the region of the current location, wherein the target values are each specific to different regions.

8. The method according to claim 1, further comprising:

sending a test request via the network to the teleoperator remotely controlling the vehicle.

9. A computer-readable medium on which is stored a computer program including instructions for location-dependent verification of a teleoperator for remote control of a vehicle, wherein at its current location, the instructions, when executed by a computer of a vehicle, causing computer of the vehicle to repeatedly and automatically perform the following steps:

receiving, from the teleoperator, during remote control by the teleoperator, a response message requested via a network;

ascertaining a current value of at least one network-dependent property of the received response message;

determining a target value of the at least one network-dependent property;

verifying the teleoperator using a check of the current value of the at least one network-dependent property and of the determined target value based on a test condition, wherein, in the case of a positive test result of the check, the teleoperator is authorized to perform the remote control of the vehicle, and in the case of a negative test result of the check, the vehicle terminates the remote control and/or sends a safety warning;

wherein after the ascertainment of the current value of the at least one network-dependent property, the following step is performed:

adjusting the current value using a model based on at least one network-dependent parameter, wherein the current value is adjusted by a correction value as a function of an occurrence of the at least one network-dependent parameter; and wherein the current location of the vehicle is in a region, and the network-dependent parameter comprises a current local network utilization in the region, wherein the current value is adjusted by increasing or reducing the ascertained current value by the correction value.

10. A device for data processing in a vehicle, configured for location-dependent verification of a teleoperator for remote control of the vehicle, wherein at its current location, the device repeatedly and automatedly performing the following steps:

receiving, from the teleoperator, during remote control by the teleoperator, a response message requested via a network;

ascertaining a current value of at least one network-dependent property of the received response message;

determining a target value of the at least one network-dependent property;

verifying the teleoperator using a check of the current value of the at least one network-dependent property and of the determined target value based on a test condition, wherein, in the case of a positive test result of the check, the teleoperator is authorized to perform the remote control of the vehicle, and in the case of a negative test result of the check, the vehicle terminates the remote control and/or sends a safety warning;

wherein after the ascertainment of the current value of the at least one network-dependent property, the following step is performed:

adjusting the current value using a model based on at least one network-dependent parameter, wherein the current value is adjusted by a correction value as a function of an occurrence of the at least one network-dependent parameter; and wherein the current location of the vehicle is in a region, and the network-dependent parameter comprises a current local network utilization in the region, wherein the current value is adjusted by increasing or reducing the ascertained current value by the correction value.

* * * * *